(12) United States Patent
Wunderer (10) Patent No.: US 8,721,091 B2
(45) Date of Patent: May 13, 2014

(54) OPTICAL SYSTEM AND SENSOR FOR CHECKING VALUE DOCUMENTS HAVING SUCH AN OPTICAL SYSTEM

(75) Inventor: Bernd Wunderer, Naples, FL (US)

(73) Assignee: Giesecke & Devrient GmbH, Munich (DE)

( * ) Notice: Subject to any disclaimer, the term of this patent is extended or adjusted under 35 U.S.C. 154(b) by 171 days.

(21) Appl. No.: 13/378,823

(22) PCT Filed: Jun. 17, 2010

(86) PCT No.: PCT/EP2010/058513
§ 371 (c)(1),
(2), (4) Date: Dec. 16, 2011

(87) PCT Pub. No.: WO2010/146103
PCT Pub. Date: Dec. 23, 2010

(65) Prior Publication Data
US 2012/0092648 A1    Apr. 19, 2012

(30) Foreign Application Priority Data

Jun. 18, 2009 (DE) .......................... 10 2009 025 368

(51) Int. Cl.
*G03B 21/28* (2006.01)
(52) U.S. Cl.
USPC ........ 353/99; 353/7; 353/37; 353/38; 353/46; 353/98; 348/744; 348/747; 359/236; 359/237

(58) Field of Classification Search
USPC ......... 353/7, 8, 20, 30, 31, 32, 33, 34, 37, 38, 353/46, 88, 97, 98, 99; 348/744–747, 348/E13.028, E13.029, E13.033, E13.043; 359/235–236, 627, 530, 546; 349/5, 349/7–9
See application file for complete search history.

(56) References Cited

U.S. PATENT DOCUMENTS

| 4,509,837 A | 4/1985 | Kassies |
| 5,150,259 A | 9/1992 | Oidhi |
| 5,339,382 A | 8/1994 | Whitehead |
| 6,300,986 B1 * | 10/2001 | Travis ............................... 349/5 |
| 6,601,974 B1 * | 8/2003 | Hewlett et al. ................ 362/297 |

(Continued)

FOREIGN PATENT DOCUMENTS

| DE | 510063 | 8/1929 |
| DE | 510063 | 10/1930 |

(Continued)

OTHER PUBLICATIONS

German Patent and Trademark Office Search Report dated Mar. 25, 2010.
International Search Report in PCT/EP2010/058513, Oct. 6, 2010.

*Primary Examiner* — Sultan Chowdhury
(74) *Attorney, Agent, or Firm* — Workman Nydegger (57) ABSTRACT

An optical system having a plane anisotropic retroreflector portion which specularly reflects radiation components in a first plane of incidence, but retroreflects radiation components in a second plane of incidence, a first imaging portion which produces on the retroreflector portion a line-shaped intermediate image of an object point in an object plane in a specified position relative to the system, the image extending along a line in the second plane of incidence, and a second imaging portion by means of which the line-shaped intermediate image is imaged into an image point.

13 Claims, 4 Drawing Sheets

(56) References Cited

U.S. PATENT DOCUMENTS

| | | |
|---|---|---|
| 7,172,290 B2 * | 2/2007 | Li .................................. 353/37 |
| 7,224,526 B2 * | 5/2007 | Putilin et al. .................. 359/462 |
| 7,580,171 B2 * | 8/2009 | Uhl et al. ...................... 359/235 |
| 2004/0080938 A1 | 4/2004 | Holman et al. |
| 2006/0087735 A1 | 4/2006 | Nilsen et al. |
| 2008/0212182 A1 | 9/2008 | Nilsen |
| 2009/0174879 A1 | 7/2009 | Bloss et al. |

FOREIGN PATENT DOCUMENTS

| | | |
|---|---|---|
| DE | 10159234 A1 | 6/2003 |
| DE | 102006017256 A1 | 10/2007 |
| DE | 102006045624 A1 | 4/2008 |
| EP | 0694795 | 1/1996 |
| EP | 0694795 A2 | 1/1996 |

* cited by examiner

OPTICAL SYSTEM AND SENSOR FOR CHECKING VALUE DOCUMENTS HAVING SUCH AN OPTICAL SYSTEM

BACKGROUND OF THE INVENTION

1. Field of the Invention

The present invention relates to an optical system, in particular an imaging optical system, a sensor for checking value documents with such an optical system, and a method for imaging an object point.

2. Related Art

Value documents are understood in this connection to be sheet-shaped objects that represent for example a monetary value or an authorization and hence should not be producible arbitrarily by unauthorized persons. Hence, they have features that are not easily produced, in particular copied, whose presence is an indication of authenticity, i.e. production by an authorized body. Important examples of such value documents are cards, coupons, vouchers, checks and in particular bank notes. Bank notes for the purposes of the invention are sheet-shaped.

Optical systems in general will hereinafter be understood to be systems that influence optical radiation, in particular changing its ray trajectory. Optical radiation designates here in the known way electromagnetic radiation in the UV and/or IR and/or in particular visible wavelength ranges.

For examining value documents there are frequently employed optical sensors that capture in locally resolved fashion optical properties of a value document to be analyzed and for this purpose image strip-shaped areas on the value document at least partly onto a substantially line-shaped field of receiving elements. The receiving elements form, in dependence on the radiation falling thereon, receive signals which together represent an image of the respective area of the value document. By motion of the value document transversely to the direction of the line or strip, a two-dimensional image of the value document can be captured through sequential capture of such images during the motion past the sensor.

In many applications it is desirable here that the sensor can be of very compact and inexpensive construction. The optical resolution, on the other hand, need not always meet high demands. Sensors with conventional imaging systems which employ only lenses or parabolic mirrors do not always meet these demands to the desired extent upon line-by-line imaging. In the past, self-focusing light guides, so-called SELFOCs, have sometimes been used for this purpose, but their availability is decreasing. This applies in particular to those SELFOCs having back focal distances necessary for achieving necessary depths of sharpness.

The present invention is hence based on the object of providing an optical system for imaging areas of a value document, a corresponding imaging method, and a sensor for capturing optical properties of a value document, which make possible a compact structure without the use of SELFOCs.

BRIEF SUMMARY OF THE DISCLOSURE

This object is achieved by an optical system having a plane anisotropic retroreflector portion which specularly reflects radiation components in a first plane of incidence, but retroreflects radiation components in a second plane of incidence, a first imaging portion which produces on the retroreflector portion a line-shaped intermediate image of an object point in an object plane in a specified position relative to the system, said image extending along a line in the second plane of incidence, and a second imaging portion by means of which the line-shaped intermediate image is imaged into an image point.

The object is further achieved by a method for imaging an object point wherein the object point is imaged onto a line-shaped intermediate image on an anisotropic retroreflector portion such that the intermediate image extends with its longitudinal direction in a plane of incidence where the retroreflector portion acts retroreflectively, and wherein the intermediate image is imaged onto an image point. The longitudinal direction of the intermediate image is understood here to be in particular the direction of the line which is formed by the intermediate image.

That the retroreflector portion is plane is understood to mean that rays which fall on the retroreflector portion from the same direction or are parallel, but impinge thereon in different places, are reflected in the same respective directions. In particular, the retroreflector portion can for this purpose have optically active, preferably like configured, structures which are arranged along a plane.

Specular reflection in the first plane of incidence is understood within the framework of the invention to mean that a ray in the first plane of incidence and enclosing a given angle of incidence with a normal to the plane of the retroreflector portion is deflected by the retroreflector portion in a new direction, given by an angle of emergence relative to the normal to the plane of the retroreflector portion. The angles of incidence and emergence are then equal as usual. Upon incidence orthogonally to the plane of the retroreflector portion, i.e. an angle of incidence of 0°, the ray in the first plane of incidence is reflected back on itself. The terms "retroreflect" and "retroreflection" are understood within the framework of the invention to mean, in contrast, that an incident ray in the second plane of incidence and the retroreflected ray resulting from the retroreflection of the incident ray extend parallel, whereby a certain mutual offset of the rays in a direction parallel to the plane of the retroreflector portion can be given. Depending on the type of the retroreflector portion, however, this behavior only occurs in a certain range of angles of incidence. Unless otherwise stated, it will be assumed within the framework of the invention that the incident rays are in an angular range where the retroreflection is possible at least in good approximation.

An anisotropic retroreflector portion for the purposes of the invention can have for example a body with a plane surface, for example a plate, of a transparent material, on or in the plane surface of which there is formed a field of prisms, preferably roof prisms with a prism angle of 90°, extending parallel to a straight line in the first plane of incidence. The prisms provide the retroreflection in the second plane of incidence in a per se known manner, whereby the reflection can be given on the boundary surfaces of the prisms by total reflection or reflection on a reflective layer on the surface of the prisms.

Compared to a simple mirror, an anisotropic retroreflector portion for the purposes of the invention thus shows an unusual behavior: When a ray falls on the anisotropic retroreflector portion from a specified direction, it can be imagined that the reflected ray results from the incident ray or incident radiation being decomposable into first and second directional components whose vectorial sum represents the direction of the incident ray or incident radiation and which lie in the first and second planes of incidence, respectively. The first directional component is specularly reflected, but the second directional component is retroreflected, and the two reflected directional components are vectorially summed up again or superimposed. In the first plane there is effected a specular reflection, whereby a retroreflection in the second plane takes place simultaneously. It is assumed here that the direction of the incident ray is so specified that a retroreflection can take place at all. In the case of the stated roof prisms as the retroreflective structure, the direction of the incident ray can for this purpose be such that the angle of incidence of the component in the second plane of incidence is smaller than 45°.

For imaging, a point or object point from a specified object plane is imaged by means of the first imaging portion, which is accordingly configured for this purpose, onto the retroreflector portion, whereby the intermediate image arising there is only line-shaped, preferably straight-line-shaped, however. The first imaging system is so configured and arranged relative to the anisotropic retroreflector portion that the line-shaped intermediate image lies in the second plane of incidence, or extends therein. The line arises from diverging rays emanating from the object point, which are directed by the first imaging portion onto the retroreflector portion only such that they have parallel or in particular diverging components directly before the retroreflector portion in the second plane of incidence, but converge or are focused in the first plane of incidence. Because the intermediate image or line extends in the second plane of incidence, the ray or radiation components lying in this plane of incidence are thrown back in their direction of incidence, whereby an offset can occur, however, in dependence on the type of the retroreflector portion, the position of the incident ray relative to the retroreflector portion, upon use of roof prisms relative to the roof edge of one of the roof prisms, and the angle of incidence. The radiation components in the first plane of incidence, in contrast, are specularly reflected, which is why the incident radiation is not reflected onto itself, but deflected. The retroreflected radiation components formed by the radiation components in the second plane of incidence now converge again, while the other components must be concentrated again. This purpose is served by the second imaging portion, by means of which the line-shaped intermediate image is imaged into an image point. This formation of the image point is thus effected with the cooperation of both the anisotropic retroreflector portion and the second imaging portion.

Since the intermediate image is formed on the retroreflector portion and has an only small extension in the first plane of incidence, geometrical errors are strongly reduced. These may be in particular errors that can arise from the finite extension of the retroreflective structures in the first plane of incidence and from oblique incidence thereon in the second plane of incidence and resulting differences in the length of the optical paths between the object point and the retroreflector portion in the second plane of incidence. Simultaneously, it is possible to construct a compact optical system in which no SELFOCs need to be employed. Furthermore, such systems can have very different back focal distances and thus be adapted simply to given requirements, in particular also greater depths of sharpness. Further, they can be manufactured simply if configured suitably.

In order for the image point to become as sharp as possible, the optical system is preferably so configured that it causes a one-to-one imaging. This can be obtained in especially simple fashion by the two imaging portions possessing like imaging properties, for example equal focal lengths and/or back focal distances.

The production of the intermediate image can in principle be effected in any arbitrary way. Preferably, however, in the optical system, at least one of the imaging portions has at least one cylindrical optic, preferably a cylindrical lens and/or a cylindrical or parabolic mirror, which preferably produces the intermediate image. A cylindrical optic is understood in this connection to be an optic that has imaging, i.e. in particular concentrating, properties for rays in a plane given by the cylindrical optic, but not for rays in a plane orthogonal thereto. A cylindrical lens is understood here to be a transparent body, or a portion of a transparent body, that has at least one surface portion with the form of a cylindrical segment, or forms an aspherical optic with corresponding imaging properties. Accordingly, a cylindrical mirror is understood to be a portion of a reflective surface or a reflective layer that is cylindrically formed. This embodiment has the advantage that the imaging can be produced with very simple means.

Preferably, in the optical system, a reflective element is arranged in the ray path between at least one of the imaging portions and the retroreflector portion. This embodiment allows the entire ray path of the optical system, in particular in the first plane of incidence, to be bent or folded at least once. In the simplest case, the reflective element can be given by a preferably reflective, in particular totally reflective, surface of a transparent body. The system can be so designed that at least one of the imaging portions bends or folds the ray path. This permits an especially compact structure of the system.

In particular, in the optical system, at least one of the imaging portions can comprise a cylindrical lens and an imaging reflective element, preferably a parabolic or cylindrical mirror, which preferably serve to form the intermediate image or to image the intermediate image. The imaging system then fulfills two functions, namely, to produce the intermediate image or image the intermediate image, and to bend or fold the ray path. In an especially favorable embodiment, the ray path between the cylindrical lens and the imaging reflective element can preferably be or extend parallel, projected onto a plane orthogonal to the cylindrical axis, preferably in the first plane of incidence.

In this embodiment, it is particularly preferable that the imaging reflective element is formed by a reflective surface of a body forming the cylindrical lens. This makes it possible to configure the respective imaging portion in one piece, which not only permits simple manufacture, but also ensures a good orientation of the cylindrical lens and the imaging reflective element, in particular also relative to each other.

Further, it is preferred that at least one of the imaging portions, preferably the two optical portions and the retroreflector portion is or are configured in one piece together. This, too, makes possible an especially simple manufacture. The imaging portion can then be configured in particular as described in the preceding paragraph.

Further, it is preferred that there is formed in the second plane of incidence a diaphragm, preferably a slit diaphragm, whose edge is formed at least partly by the retroreflector portion. A diaphragm edge portion opposing the retroreflector portion can then extend at a specified distance from the plane of the retroreflector portion. This configuration offers two advantages. On the one hand, the diaphragm can reduce scattered light arising from multiple reflections on the imaging portions depending on the configuration thereof. On the other hand, it can limit the intermediate image and thus act as a field stop, which strongly simplifies the structure of the optical system. The diaphragm is preferably then arranged in the middle plane of the ray path in the area of the retroreflector portion.

An especially simple structure results, in particular with a configuration for a one-to-one imaging, from the optical system being constructed mirror-symmetrically with respect to a plane or mirror plane parallel to the second plane of incidence. In particular, the plane can cut the intermediate image on the retroreflector portion at least approximately. If a diaphragm is provided in the second plane of incidence, it preferably lies in the stated mirror plane.

In another development, the optical system has parallel to the retroreflector portion a further plane anisotropic retroreflector portion. The first imaging portion can then be so configured that it produces a further line-shaped intermediate image of the object point on the further retroreflector portion. The second imaging portion is then preferably so configured that it images the further line-shaped intermediate image onto the image point. Preferably, the two retroreflector portions are arranged parallel to each other. Particularly preferably, the system is mirror-symmetric with respect to a plane parallel to the retroreflector portions.

An optical system according to the invention can be used advantageously for sensors for value documents. Hence, the subject of the invention is also a sensor for capturing optical properties of a value document with an optical system according to the invention which in particular images an area of the value document to be analyzed.

The optical system provides to be especially advantageous for sensors that spectrally decompose optical radiation emanating from the object point and capture the spectral components. The sensor stated in the preceding paragraph can then have in particular a dispersive device downstream of the optical system, and a field of receiving elements for receiving different spectral components produced by the dispersive device. The field of receiving elements can have in particular, for the radiation from an object point, a line of receiving elements which is so arranged relative to the dispersive device that different receiving elements of the line receive or capture different spectral components. The optical system then as a result, in connection with the dispersive device, images respectively one spectral component or spectral components from a specified wavelength range onto a corresponding one of the receiving elements. In particular, the dispersive device can have as a dispersive element a diffractive element, for example a grating, or preferably a prism.

Further, the sensor can preferably have a radiation source which emits optical radiation, preferably radiation in the visible and/or IR wavelength range, onto the area of the object plane of the optical system in a capture area of the sensor, i.e. an object plane area which is imaged onto the receiving elements. Preferably, the radiation source produces a strip-shaped illumination pattern.

DESCRIPTION OF THE DRAWINGS

The invention will hereinafter be explained further by way of example with reference to the drawings. There are shown:

FIG. 3 a schematic representation of an apparatus for processing value documents, FIG. 4 a schematic partial representation of a sensor of the apparatus in FIG. 3, which is configured for capturing optical properties of value documents, FIG. 5 a perspective representation of an optical system of the sensor in FIG. 4 in the form of a body serving as first and second imaging portions and retroreflector portion, FIG. 6 a view of a ray path in the body in FIG. 5 from one side, and FIG. 7 a view of a ray path of a body, serving as first and second imaging portions and retroreflector portion, of an optical system according to a further preferred embodiment.

DETAILED DESCRIPTION OF PREFERRED EMBODIMENTS OF THE INVENTION

Figure 1:
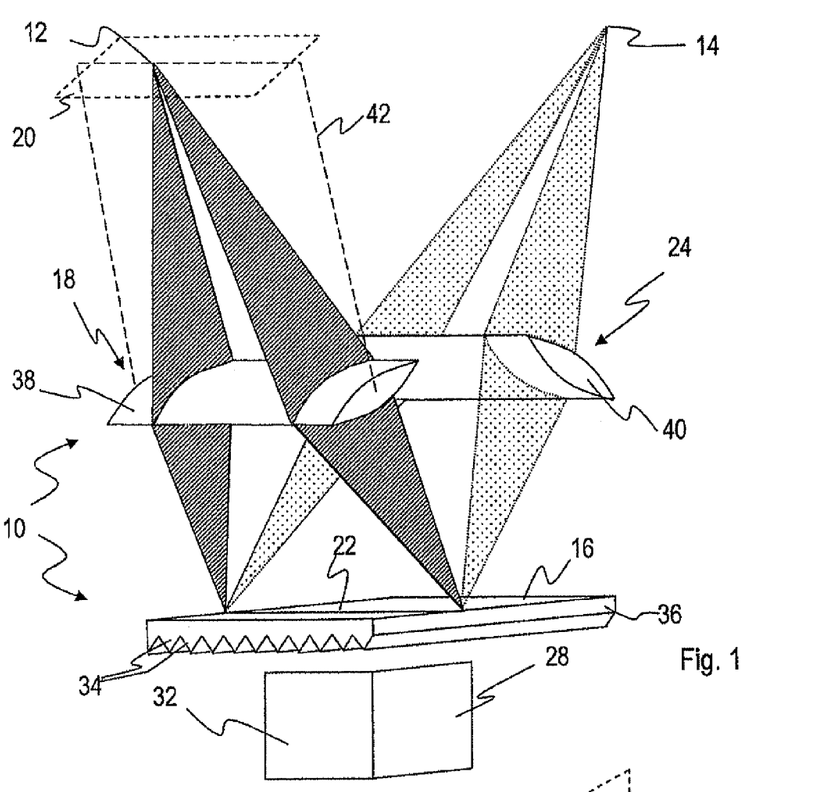
FIG. 1 a schematic view of a very simple embodiment of an optical system.

An optical system 10 in FIG. 1 serves for imaging an object point 12 onto an image point 14. For this purpose, it possesses a plane anisotropic retroreflector portion 16, a first imaging portion 18 which produces on the retroreflector portion 16 a line-shaped intermediate image 22 of the object point 12, which lies in an object plane 20 in a specified position relative to the system 10, and a second imaging portion 24 by means of which the line-shaped intermediate image 22 is imaged into the image point 14.

The term "imaging" for the purposes of the invention also comprises here the case that the imaging is not perfectly sharp, but has a resolution limited by the components of the optical system.

The plane anisotropic retroreflector portion 16 specularly reflects radiation components 26 in a first plane of incidence 28; however, radiation components 30 in a second plane of incidence 32 are retroreflected, i.e. thrown back in the same direction from which they come, or parallel to the direction from which they come. Representing the direction of propagation of the radiation locally as a vector, this means that the radiation is representable as the superimposition of two vector components in the first and second planes of incidence. The radiation thrown back by the retroreflector portion 16 is then propagated in a direction given by components in the two planes of incidence. The component in the first plane of incidence corresponds to specular reflection, while the component in the second plane of incidence corresponds to retroreflection.

The position of the first and second planes of incidence relative to each other depends on the configuration of the retroreflector portion. In the example, the first and second planes of incidence 28 and 32 are oriented orthogonally to each other.

The retroreflector portion 16 is plane, i.e. the above-mentioned reflecting properties are independent of the place where the rays from the imaging portion fall on the retroreflector portion.

Figure 2:
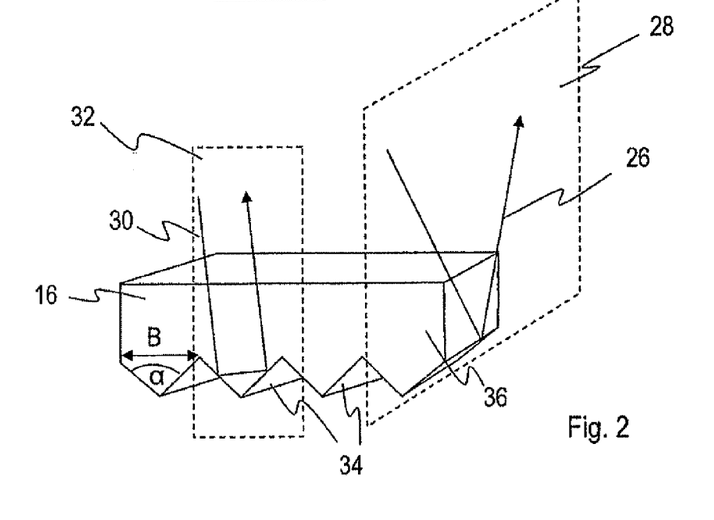
FIG. 2 a schematic view of a part of a retroreflector portion in FIG. 1.

The retroreflector portion 16 comprises as the anisotropically reflective structure, in the present example, elongate symmetric prisms 34, more precisely, roof prisms with a prism angle of 90°, arranged equidistantly and extending along mutually parallel straight lines, and formed in a plane surface of a base body 36. Because the retroreflector portion 16 is of plane configuration, mutually corresponding edges of the prisms 34 lie respectively at least approximately in a plane. The cross section of the prisms 34 orthogonally to the longitudinal extension, i.e. in the second plane of incidence, has in the example the form of an isosceles triangle with a vertical angle α of 90° and a base width B of about 300 μm. The refractive index of the material of the prisms is chosen such that the retroreflection is effected by double total reflection on the sides of the prisms. The retroreflection preferably occurs here over a whole range of angles of incidence onto the plane of the retroreflector portion 16 or the prism assembly.

The first and second imaging portions 18, 24 are configured in the example for achieving a one-to-one imaging in connection with the retroreflector portion 16, and possess for this purpose like imaging properties. They are thus like configured and respectively comprise cylindrical lenses 38 and 40 with equal focal lengths or back focal distances.

The first imaging portion 18, in the example the cylindrical lens 38, is so arranged that it images the object point 12 in the object plane 20 into the line-shaped intermediate image 22 on the retroreflector portion 16, more precisely, the area of the prisms 34. The first imaging portion 18 and in particular its cylindrical lens 38 are so arranged relative to the retroreflector portion 16 that the line-shaped intermediate image extends at least in good approximation along a line in the second plane of incidence. The object plane 20 extends at least approximately orthogonally to an optical plane 42 of the cylindrical lens, i.e. a plane through the cylindrical lens axis with regard to which the imaging properties of the cylindrical lens are mirror-symmetric. This plane extends in the example through the cylindrical lens axis and the vertex line of the cylindrical lens.

In general, rays emanating from the object point 12 which are directed by the first imaging portion 18 onto the retroreflector portion 16 will fall on the retroreflector portion 16 obliquely both to the first and to the second plane of incidence 28, 32. Such a ray is reflected in accordance with its components or directional components, i.e. projections of a unit vector along the incident ray onto the planes of incidence: The component in the first plane of incidence 28, i.e. the projection of the unit vector onto the first plane of incidence 28, is specularly reflected in the direction of the image point 14, while the component in the second plane of incidence 32, i.e. the projection of the unit vector onto the second plane of incidence 32, is retroreflected. The direction, resulting from the specularly reflected and retroreflected components, of the ray reflected by the retroreflector portion 16 results from vectorial addition of the reflected components and is directed onto the image point 14. In particular, the retroreflection ensures that in a projection onto the second plane of incidence the line-shaped intermediate image can again be imaged onto a point, the image point 14.

The sharpness of the imaging is influenced, inter alia, by the aberrations upon the retroreflection on the prisms and diffraction on the prisms. Due to the inherent principle, there occurs upon the retroreflection an offset, dependent on the width B of the prism base, between incident ray and retroreflected ray in the second plane of incidence. Since the object point is imaged onto the line-shaped intermediate image on a retroreflective structure of the retroreflector portion 16, in the example the prisms 34, these aberrations through the retroreflection are strongly reduced.

An optical system working according to the principle of the above-described optical system can be used in particular in sensors for optical analysis of value documents.

Figure 3:
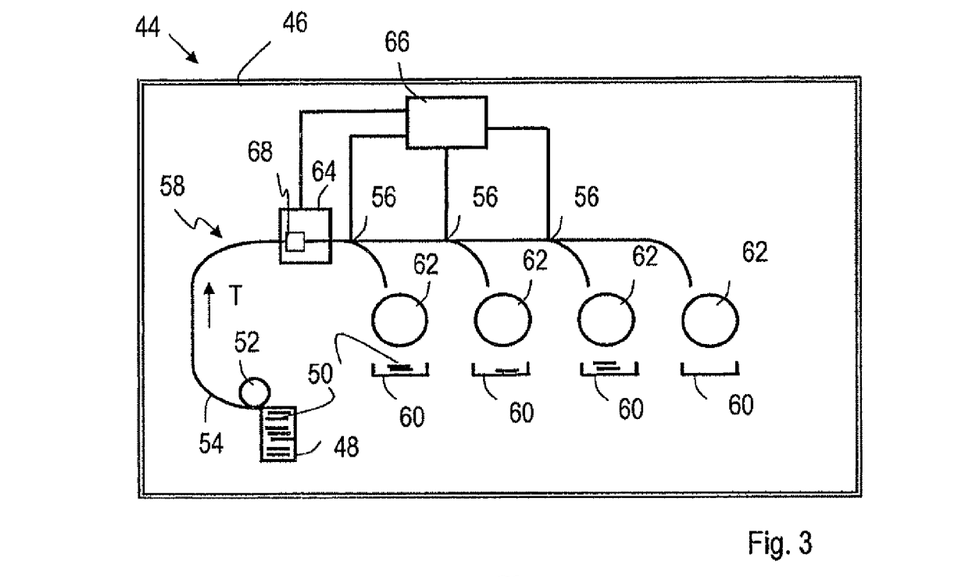

A value document processing apparatus 44 in FIG. 3, in the example a bank-note processing apparatus, has in a housing 46 an input pocket 48 for inputting value documents 50, in the example bank notes, to be processed, a singler 52 which can access value documents 50 in the input pocket 48 and single them, a transport device 54 for transporting the singled value documents, with gates 56, and, in branches of a transport path 58 given by the transport device 54, after the gates 56 in the transport direction, respective output pockets 60 for taking up value documents processed by means of the value document processing apparatus 44. Before the output pockets 60 there are arranged stacking wheels 62. Further, the value document processing apparatus 44 possesses, along the transport path 58 given by the transport device 54, a sensor assembly 64 arranged before the gates 56 for capturing properties of value documents 50 transported along the transport path 58, and a control and evaluation device 66 which is connected via signal connections at least to the sensor assembly 64 and the gates 56 and is configured for evaluating sensor signals from the sensor assembly 64 that represent at least one property of a value document 50 captured by the sensor assembly 64, and controlling at least one of the gates 56 in dependence on the result of the evaluation of the sensor signals.

The sensor assembly 64 comprises in this embodiment example a sensor 68 for capturing optical properties of the value documents, in the example a spectrally resolved image of the value documents, for example for checking for soiling, and/or for ascertaining the nominal value of the value documents and/or for ascertaining the authenticity of the value documents according to specified criteria. The sensor assembly can further comprise for example an ultrasonic sensor, not shown in FIG. 3, for capturing the state of value documents, for example the presence of adhesive strips, which captures transmission properties of the value documents for ultrasound.

The control and evaluation device 66 captures the signals of the sensor assembly 64 and ascertains whether the value document captured by the sensor assembly 64 is in a fit state, i.e. suitable for further use as a means of payment, according to at least one specified criterion for soiling, or what nominal value it has, or whether it is authentic. In dependence on the result of the check, the control and evaluation device 66 controls at least one of the gates 56 such that the value document 50 is conveyed by the transport device 54 into an output pocket 60 associated with the check result or corresponding to a certain specified type, in particular nominal value, of value documents, and deposited there.

Figure 4:
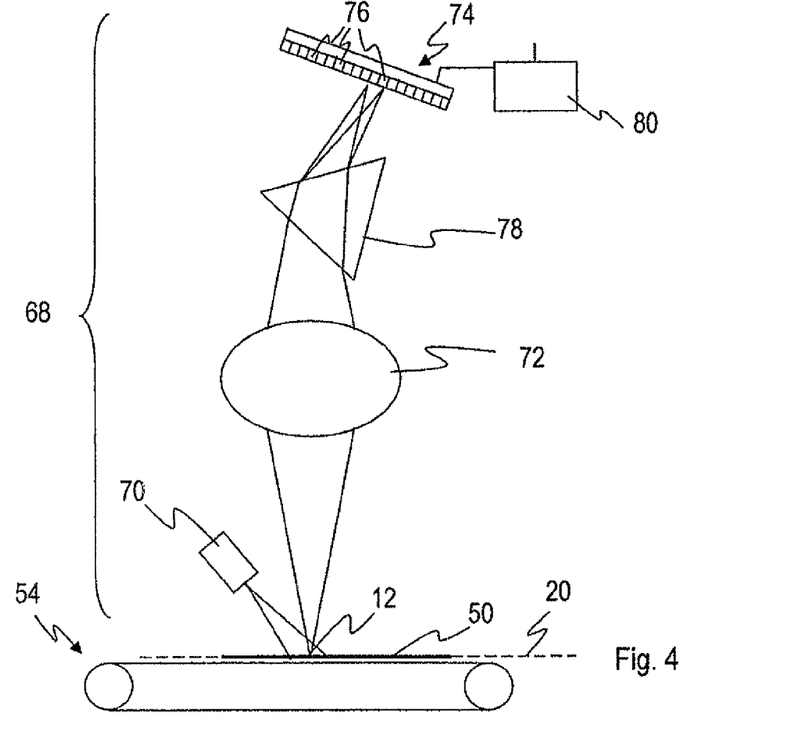

The sensor 68 serving for ascertaining the spectrally resolved image of the value document is shown very schematically together with a part of the transport device 54 in FIG. 4. The sensor 68 is designed for line-by-line capture of a spectrally resolved image of the value document during transport past the sensor 68. The lines extend transversely to the transport direction. The sensor 68 has an illumination device 70 for emitting optical radiation, in the example visible light, preferably additionally also infrared radiation, onto the value document, an optical system 72 for imaging at least part of the illuminated area on the value document 50 onto a receiver 74 which has a two-dimensional field of receiving elements 76 arranged in a matrix, and a dispersive device 78 arranged in the ray path between the optical system 72 and the receiver 74 and spatially splitting incident radiation in dependence on the wavelength, so that spectral components of the incident radiation fall on different receiving elements 76 depending on the degree of splitting. For processing and evaluating the signals of the receiver 74 or of the receiving elements 76 and preferably also for controlling the illumination device 70 there serves a sensor evaluation device 80, connected via signal connections to the receiver 74 and preferably to the illumination device, which, after evaluation, emits via the signal connection to the control and evaluation device 66 signals that represent the result of the evaluation.

The value document 50 which is transported by the transport device 54 past the sensor 68 is illuminated during transport with optical radiation from an illumination device 70 for emitting optical radiation, in the example visible light. The illumination device 70 is so configured that the optical radiation illuminates on the value document 50 only a strip which extends with its longitudinal direction transversely to the transport direction of the value document 50 across its entire width and lies at least partly in the capture area of the sensor, in particular the object plane. The capture area of the sensor is given by the area that is imaged onto the receiver 74 by the optical system 72.

Optical radiation emanating from at least part of the illuminated area of the value document in the capture area is imaged onto the receiver 74 by the optical system 72, whereby the dispersive device 78 spectrally splits the optical radiation. For this purpose, the optical system 72 is so arranged relative to the transport device 54 or the transport path 58 that a value document lies at least in good approximation in the transport path portion in the sensor in an object plane of the optical system 72. In this embodiment example, the dispersive device comprises a prism made of a transparent material that is dispersive in the visible, preferably also infrared, wavelength range.

The illumination device 70, the optical system 72, the dispersive device 78 and the receiver 74 are so oriented that the spectral splitting is effected transversely to that plane where the ray path extends for the line or strip for a wavelength, and there is effected both a locally resolved detection in a direction corresponding to the direction of the strip or line transversely to the transport direction, and a spectrally resolved detection in a direction extending transversely, in particular orthogonally, thereto.

Figure 5:
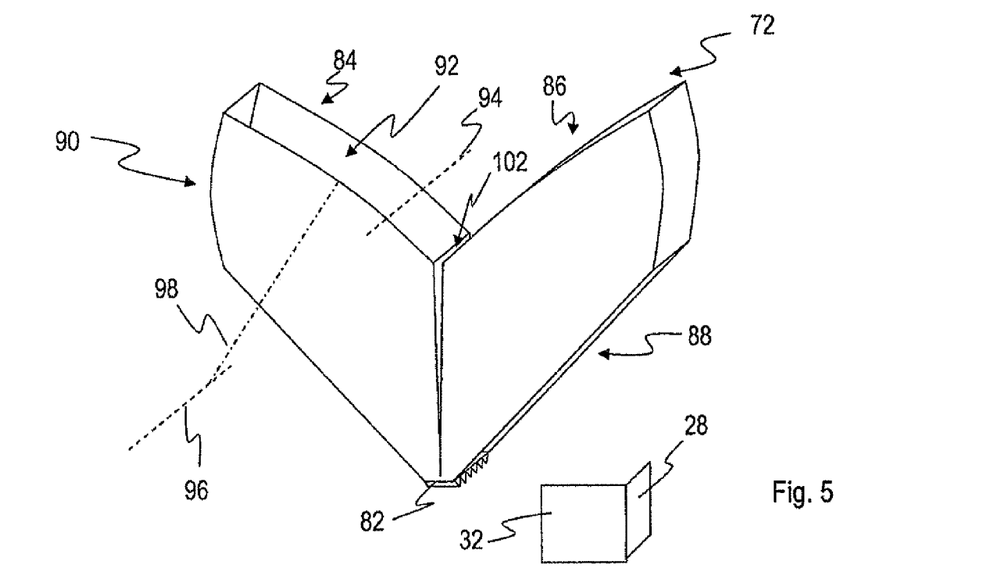
Figure 6:
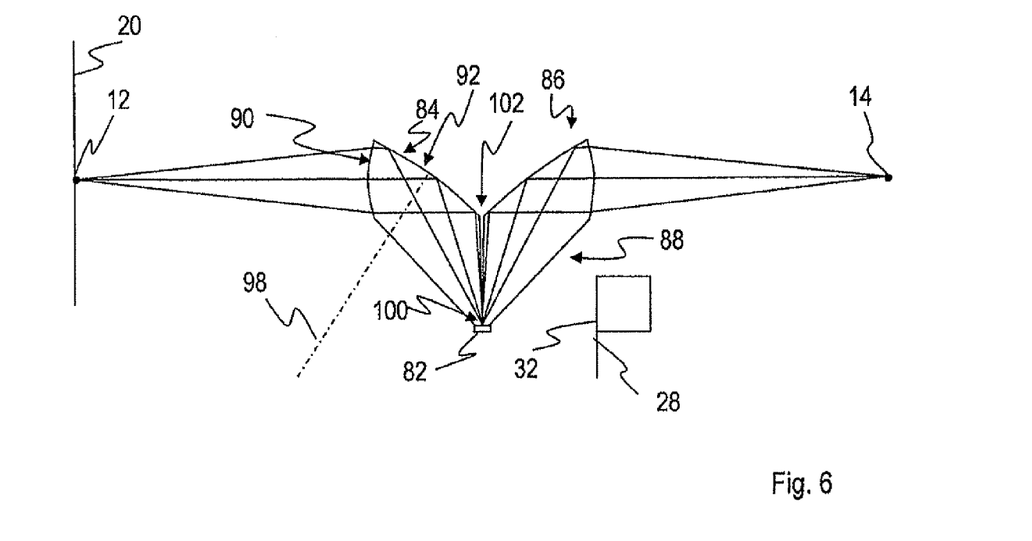

The optical system 72 is shown more precisely in FIG. 5 in a perspective view and in FIG. 6 in a sectional view. The imaging is represented here without the dispersive device 78 to simplify the representation.

In this embodiment example, the optical system 72 includes a one-pieced or integral body having both a retroreflector portion 82, including a first imaging portion 84 for imaging an object point 12 in the object plane 20, in the example the plane where the value document 50 is transported past the sensor 68, onto a line-shaped intermediate image 22 onto the retroreflector portion 82, and a second imaging portion 86 which images the intermediate image, partly specularly reflected and partly retroreflected by the retroreflector portion, onto an image point 14 in an image plane which, upon application in the sensor 68, lies in the plane of the receiving elements 76.

The body can be manufactured for example from a material transparent to optical radiation in the spectral range to be analyzed with the sensor, for example a suitable plastic or glass. The refractive index at least in the area of the retroreflector portion 82 is preferably so chosen that the retroreflection is effected by total reflection. Otherwise or additionally, the corresponding retroreflective surface of the retroreflector portion 16 can be mirror-coated, for example by application of a suitable layer.

The retroreflector portion 82 is constructed like the retroreflector portion 16, whereby, however, the base body 88 is configured differently on its side facing away from the retroreflective structure, because it at the same time forms the first and second imaging portions 84, 86. Because the retroreflector portion 82 is constructed like the retroreflector portion 16 and the properties of the retroreflector portion 82 correspond to those of the retroreflector portion 16, the same reference signs as above are employed here for the same elements, planes and images and the corresponding explanations also apply here accordingly.

The imaging portions are configured mirror-symmetrically with respect to a plane extending orthogonally to the plane retroreflector portion 82 or parallel to the second plane of incidence 32.

Hence, it is sufficient to describe only the first imaging portion 84 more precisely. The description will then apply accordingly to the second portion 86.

The imaging portion 84 acts as a cylindrical optic which, as described above, images a point in the object plane into a line-shaped intermediate image 22 on the retroreflector portion 82, and simultaneously bends the ray path such that there is effected a nearly orthogonal incidence of the radiation on the retroreflector portion 82. This has the advantage that the occurrence of scattered light is reduced.

The imaging portion 84 has for this purpose a first curved surface portion 90 with the form of a cylindrical segment whose radius is so chosen that it images the point in the object plane to infinity. This means that the components of the rays emanating from the object point 12, said components lying in a plane orthogonal to the cylindrical axis or, in the example, in the first plane of incidence, extend parallel after passing the surface portion 90. Hence, the surface portion 90 acts like a cylindrical lens.

A second surface portion 92 of the base body 88 opposing the first surface portion 90 is configured as a linear parabolic mirror, for example by a reflective layer. The cylindrical axis 94 of the first curved surface portion 90 and the longitudinal axis 96 of the second curved surface portion 92 are oriented parallel to each other, so that they are parts of a cylindrical optic. In particular, in this example the longitudinal axis 96 lies in the optical plane of the first surface portion 90. The parabolic axis 98 of the parabolic mirror is so inclined relative to the first surface portion 90 that an angle between the plane through the cylindrical axis of the first curved surface portion 90 and the longitudinal axis 96 of the second surface portion 92 and the parabolic axis 98 is between 35° and 55°, preferably 40° and 50°, in the example 42°. This causes the ray path to be folded or bent in the direction of the retroreflector portion 82. The curvature of the second surface portion 92 is so chosen that the focal line of the parabolic mirror lies on or in the retroreflector portion 82, so that an object point 12 in the object plane 20 is imaged onto a line or a line-shaped intermediate image on or in the retroreflector portion 82. The curvature of the second surface portion 92 or of the parabolic mirror is further so chosen that the focal length is smaller than that of the first surface portion 90. This makes it possible to keep the distance from the retroreflector portion 82 small. Further, there arises thereon a smaller intermediate image, which helps to reduce the aberrations through the optical system.

Between the areas of the base body 88 which form the first and second imaging portions 84, 86, there is formed in this embodiment example a diaphragm 100 extending orthogonally to the plane of the retroreflector portion 82 or parallel to the second plane of incidence, and limited on one side by the retroreflector portion 82. On the opposing side it is limited in the example by the end of a slit 102 in the base body 88, which extends orthogonally to the plane of the retroreflector portion 82 between the stated areas of the base body 88 and ends at a small distance, in the example about 0.1 mm, above the retroreflector portion 82. The surfaces of the base body 88 limiting the slit are so configured or designed, for example by coating with a non-transparent material, that a diaphragm arises for the ray path of the optical system. In other embodiment examples, the slit could also be replaced by another element which limits the ray path, for example a non-transparent layer. Hence, the diaphragm 100 extends with its longitudinal extension parallel to the second plane of incidence and in a mirror symmetry plane of the optical system.

This diaphragm 100, on the one hand, reduces scattered light which can arise from multiple reflection on unutilized surfaces of the base body 88 and on the optically active surfaces themselves. Because it ultimately also limits the intermediate image 22 on the retroreflector portion 82, however, it also acts as a field stop. Thus, the sensor 68 need not have a slit-shaped illumination of the value document 50 or a slit-shaped field stop arranged directly above the value document, in order to obtain a slit-shaped image necessary for the spectral decomposition by means of the dispersive device 78. The diaphragm 100 is in this connection in particular so oriented that the image of its narrow side on the receiver 74 extends transversely to the spectral splitting.

In other embodiment examples, the imaging can be effected solely through the first curved surface portion, while the second surface portion is of plane configuration and serves only to bend the ray path.

In yet further embodiment examples, the optical axes or planes of the imaging portions can be arranged, rather than parallel to each other as in the preceding examples, inclined to each other, thereby making it possible for compensation of the bend of the sensor ray path by the dispersive device 78.

A further embodiment example of a sensor differs from the embodiment example in FIG. 4 in that another embodiment of an optical system replaces the optical system 72.

Figure 7:
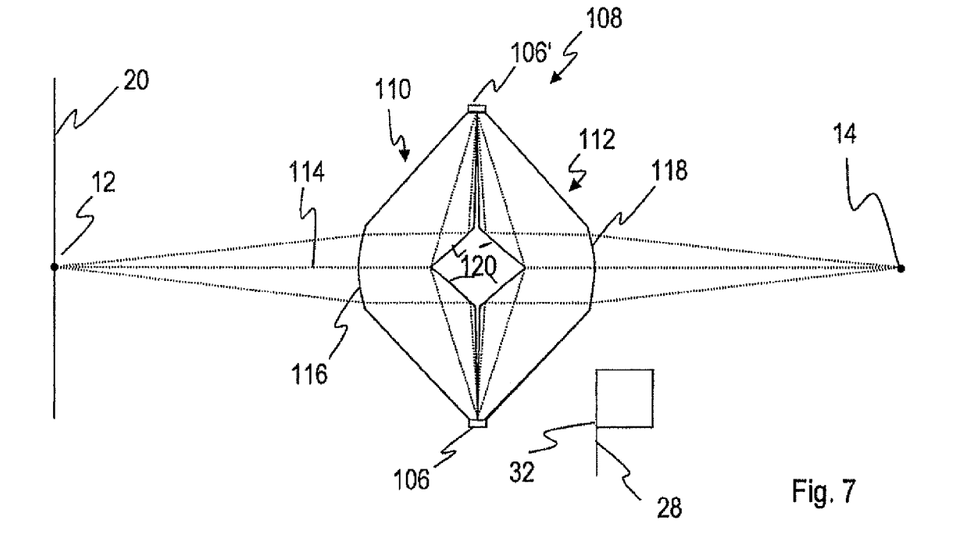

The optical system 104 differs from the optical system 72 in that it has two plane retroreflector portions 106 and 106' on which there is respectively produced a line-shaped intermediate image of an object point 12 in the object plane 20. The retroreflector portions 106 and 106' are like configured and arranged parallel to each other such that their first and second planes of incidence extend parallel to each other.

The optical system 104 is again formed by a base body 108 which comprises both the retroreflector portions 106 and 106' and first and second imaging portions 110 and 112.

The base body 108 is symmetrical with respect to a middle plane 114 which extends parallel to the planes of the retroreflector portions 106 and 106' in the middle therebetween.

The areas of the base body 108 on both sides of the middle plane 114 are respectively configured like the base body 88, whereby, however, the first curved surface portion 90 and its counterpart in the second imaging portion are replaced by common curved surface portions 116 and 118, which are likewise cylindrically formed, but whose cylindrical axes lie in the middle plane 114. As in the optical system 72, there are provided surface portions 120 forming second reflective, curved linear parabolic mirrors, which focus the components, lying in the plane of incidence 28, of the parallel ray bundle coming from the curved surface portion 116, from the object point 12 onto the respective retroreflector portion 106, 106' so as to form a linear intermediate image. Corresponding surfaces 120 parallelize the components, lying parallel to the plane of incidence 32, of the ray bundle emanating from the intermediate image, said ray bundle then being focused by the curved surface portion 118 onto the image point.

One half of a ray bundle emanating from an object point in the object plane is hence imaged from the area of the base body 108 above the middle plane 114 in FIG. 7, the other half of the ray bundle from the area of the base body 108 therebelow in FIG. 7. This embodiment offers the advantage that the imaging properties are also more symmetrical in the direction orthogonal to the middle plane.

In other embodiment examples, the illumination can also be effected in clocked fashion.

In yet other embodiment examples, the illumination device can also be configured for emitting infrared radiation or infrared radiation and visible light.

The base bodies 88 and 108 can be produced cost-efficiently by injection molding from a suitable plastic or by embossing suitable glass.

A further embodiment example can differ from the embodiment example in FIG. 5 in that the parabolic mirror 92 reflects by total reflection through a corresponding choice of the material.

The invention claimed is:

1. An optical system comprising:
    a plane anisotropic retroreflector portion which specularly reflects incident radiation components in a first plane of incidence, but retroreflects radiation components in a second plane of incidence,
    a first imaging portion which produces on the retroreflector portion a line-shaped intermediate image of an object point in an object plane in a specified position relative to the system, said image extending along a line in the second plane of incidence, and
    a second imaging portion that images the line-shaped intermediate image into an image point.

2. The optical system according to claim 1, configured so that it causes a one-to-one imaging.

3. The optical system according to claim 1, wherein the two imaging portions possess like imaging properties.

4. The optical system according to claim 1, wherein at least one of the imaging portions has a cylindrical optic.

5. The optical system according to claim 1, wherein a reflective element is arranged in a ray path between at least one of the imaging portions and the retroreflector portion.

6. The optical system according to claim 1, wherein at least one of the imaging portions bends or folds a ray path.

7. The optical system according to claim 1, wherein at least one of the imaging portions, is configured in one piece together.

8. The optical system according to claim 1, including a diaphragm in the second plane of incidence.

9. The optical system according to claim 1, which is constructed mirror-symmetrically with respect to a plane parallel to the second plane of incidence.

10. The optical system according to claim 1, comprising a further plane anisotropic retroreflector portion parallel to the retroreflector portion, and wherein the first imaging portion is so configured that it produces a further line-shaped intermediate image of the object point on the further retroreflector portion, and the second imaging portion is so configured that it images the further line-shaped intermediate image onto the image point.

11. A sensor for capturing optical properties of a value document comprising an optical system as recited in claim 1.

12. The sensor according to claim 1, comprising a dispersive device downstream of the optical system, and a field of receiving elements arranged to receive different spectral components produced by the dispersive device.

13. A method for imaging an object point, comprising the steps:
    imaging an object point onto a line-shaped intermediate image on an anisotropic retroreflector portion so that the intermediate image extends with its longitudinal direction in a plane of incidence where the retroreflector portion acts retroreflectively, and so that the intermediate image is imaged onto an image point.

* * * * *